United States Patent
Hewlett et al.

(10) Patent No.: US 8,502,838 B2
(45) Date of Patent: Aug. 6, 2013

(54) SPOKE SYNCHRONIZATION SYSTEM WITH VARIABLE INTENSITY ILLUMINATOR

(75) Inventors: Gregory James Hewlett, Richardson, TX (US); Philip Scott King, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 932 days.

(21) Appl. No.: 11/958,022

(22) Filed: Dec. 17, 2007

(65) Prior Publication Data

US 2009/0153590 A1  Jun. 18, 2009

(51) Int. Cl.
G09G 5/10 (2006.01)

(52) U.S. Cl.
USPC ............. 345/690; 348/771; 359/237; 345/88; 345/84

(58) Field of Classification Search
USPC ................. 345/57, 84, 88, 690; 353/31, 84, 353/85; 359/237; 348/771, 742, 743
See application file for complete search history.

(56) References Cited

U.S. PATENT DOCUMENTS

| 5,706,123 | A | 1/1998 | Miller et al. |
|---|---|---|---|
| 6,480,177 | B2 | 11/2002 | Doherty et al. |
| 6,937,382 | B2 | 8/2005 | Shih |
| 2004/0160655 | A1* | 8/2004 | Hewlett et al. ............... 359/237 |
| 2006/0181653 | A1* | 8/2006 | Morgan ........................ 348/771 |
| 2008/0143977 | A1* | 6/2008 | Hewlett et al. ................ 353/84 |
| 2008/0158116 | A1* | 7/2008 | Chin et al. .................... 345/84 |
| 2010/0283977 | A1* | 11/2010 | Wang et al. ................... 353/84 |

* cited by examiner

Primary Examiner — Lun-Yi Lao
Assistant Examiner — Johny Lau
(74) Attorney, Agent, or Firm — Warren L. Franz; Wade J. Brady, III; Frederick J. Telecky, Jr.

(57) ABSTRACT

A spoke synchronization technique allowing for lamp-pulsing synchronizes a spoke based on sub-arrays of a spatial light modulator. The lamp pulsing occurs during the spoke synchronization; and the lamp pulse for pulsing the lamp spans substantially across the entire spoke synchronization time period.

6 Claims, 5 Drawing Sheets

SPOKE SYNCHRONIZATION SYSTEM WITH VARIABLE INTENSITY ILLUMINATOR

CROSS-REFERENCE

The subject matter of U.S. Pat. No. 6,201,521 issued Mar. 13, 2001 is incorporated herein by reference in its entirety.

TECHNICAL FIELD OF THE DISCLOSURE

The technical field of this disclosure relates to the art of display systems employing spatial light modulators; and more particularly to the art of spoke synchronization systems with variable intensity illuminators for use in the display systems employing spatial light modulators.

BACKGROUND OF THE DISCLOSURE

In display systems employing spatial light modulators, such as micromirror-based spatial light modulators, liquid-crystal-display (LCD) panels, and liquid-crystal-on-silicon (LCOS) panels, etc., color images are often produced using sequential-color techniques. A typical sequential color technique generates a set of selected color light (e.g. red, green, blue, white, or any combinations thereof) and sequentially illuminates the spatial light modulator with the selected color light. Pixels of the spatial light modulator sequentially modulate the color light and produce the desired color image.

When spinning color wheels (or other moving sequential color devices) with transmissive (or reflective) color segments are used for generating the selected colors, boundaries of adjacent color segments in the spinning color wheel are imaged onto the pixel array of the spatial light modulator. The image of the boundary at the pixel array is often referred to as "spoke." As the color wheel spins, the spoke moves across the pixel array of the spatial light modulator. The time interval of the spoke sweeping across the entire pixel array (e.g. from the bottom to the top of the pixel array) is referred to "spoke time." During the spoke time, pixels of the spatial light modulator being swept by a spoke are illuminated by light of different colors; and these pixels can not be used for displaying pure colors. As a consequence, the total amount of time for displaying pure colors is decreased, resulting in decrease of the pure color efficiency. In this disclosure, a pure color is referred to as a color generated by a single color segment of a color wheel. The term "mixed color" or "color mixture" will be used to represent a combination of pure colors, each of which is generated by a single color segment of a color wheel.

There exist multiple approaches (which are referred to as spoke-chasing or spoke synchronization techniques) for utilizing the spoke time so as to improve the system performance and efficiency. However, these approaches are not compatible with lamp-pulsing techniques.

Lamp-pulsing techniques have been recognized as effective methods for increasing bit-depths of display systems, as well as overall system brightness, despite the mechanical limitations of the spatial light modulators employed in the display systems; and are growingly used in display systems. Current lamp-pulsing techniques, however, may not be compatible with existing spoke-chasing techniques.

Therefore, it is desired to develop a spoke-chasing technique that allows for lamp-pulsing during operation.

SUMMARY

In one example, a method for use in displaying an image is disclosed herein. The method comprises: generating a sequence of color light using a spinning color wheel that comprises a set of color segments separated by a set of segment boundaries; sequentially illuminating an array of individually addressable pixels of a spatial light modulator using the color light, wherein each segment boundary is imaged onto the pixel array forming a spoke; dividing the pixel array of the spatial light modulator into a set of sub-arrays such that the pixels of the same sub-array are connected to a common reset signal; and at a time when a spoke is sweeping the pixels of a first sub-array, operating the pixels of the first sub-array differently from the pixels of a second sub-array that is not being swept by the spoke.

In another example, a method for use in displaying an image is provided. The method comprises: generating a sequence of color light using a lamp and a spinning color wheel that comprises a set of color segments separated by a set of segment boundaries; sequentially illuminating an array of individually addressable pixels of a spatial light modulator using the color light, wherein each segment boundary is imaged onto the pixel array forming a spoke; dividing the pixel array of the spatial light modulator into a set of sub-arrays, wherein each sub-array comprises a plurality of pixel rows; at a time when a spoke is sweeping the pixels of a first sub-array, operating the pixels of the first sub-array differently from the pixels of a second sub-array that is not being swept by the spoke; and applying a lamp pulse to the lamp so as to pulse an intensity of the light from the lamp.

In yet another example, a method for use in displaying an image is provided. The method comprises: generating a sequence of color light using a lamp and a spinning color wheel that comprises a set of color segments separated by a set of segment boundaries; sequentially illuminating an array of individually addressable pixels of a spatial light modulator using the color light, wherein each segment boundary is imaged onto the pixel array forming a spoke; dividing the pixel array of the spatial light modulator into a set of sub-arrays such that the pixels of the same sub-array are connected to a common reset signal; and applying a lamp pulse to the lamp so as to pulse an intensity of the light from the lamp during a time period that is associated with a timing of the spoke sweeping across the sub-arrays.

In still another example, a display system is provided. The system comprises: a lamp for providing light; a color wheel comprising a set of color segments separated by a set of segment boundaries; a spatial light modulator comprising an array of individually addressable pixels, wherein the pixels are divided into a set of sub-arrays; a set of optical element for directing the light from the lamp to the spatial light modulator and the light from the spatial light modulator to a projection lens, wherein each segment boundary is imaged onto the pixel array forming a spoke; and a system controller in connection to the spatial light modulator, further comprising: synchronization means for operating the pixels of a sub-array being swept by a spoke differently from the pixels of a another sub-array that is not being swept by the spoke.

DETAILED DESCRIPTION OF SELECTED EXAMPLES

Disclosed herein is a spoke synchronization technique for use in display systems, wherein the spoke synchronization allows for lamp-pulsing being performed with the spoke synchronization. The spoke synchronization, as well as the lamp-pulsing, will be discussed in the following with reference to selected examples. However, it will be appreciated by those skilled in the art that the following discussion is for demonstration purpose, and should not be interpreted as a limitation. Other variations within the scope of this disclosure are also applicable.

Figure 1:
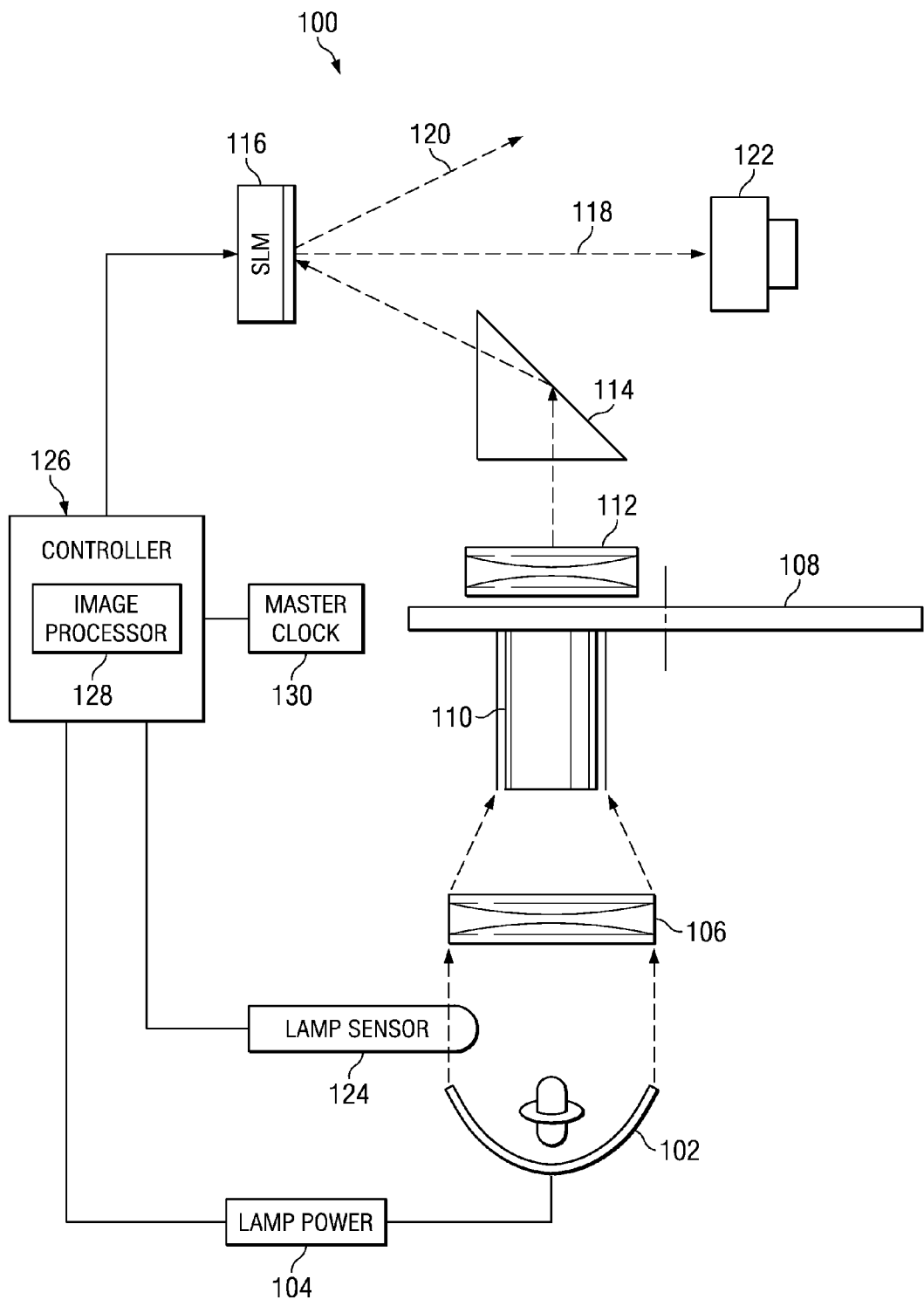
FIG. 1 schematically illustrates an exemplary display system in which examples of the spoke synchronization of this disclosure can be implemented.

Referring to the drawings, FIG. 1 schematically illustrates an exemplary display system in which the spoke synchronization and lamp pulsing can be implemented. In this example, display system 100 comprises lamp 102, optical element 106, optical integrator 110, color wheel 108, optical lens 112, prism 114, spatial light modulator 116, projection lens 122, lamp sensor 124, lamp power 104, and system controller 126 that further comprise image processor 128.

Lamp 102, which can be any suitable lamp, such as metal halide light source or xenon arc lamp, provides light for the display system. The light from lamp 102 is directed to color wheel 108 through optical element 106 and optical integrator 110. The color wheel (108) comprises a set of transmissive segments of selected colors, such as colors selected from red, green, blue, white, yellow, cyan, magenta, and any combinations thereof. The color segments are separated by segment boundaries. The color wheel is attached to a shaft such that color wheel can be rotated, and the color segments sequentially intercept the incident light from the lamp so as to generate sequential colors. The generated color light is guided to the spatial light modulator (116) through optical lens 112, and prism 114 as illustrated in the figure. Because the optical integrator (110) is positioned before the color wheel (108) (e.g. between lamp 102 and color wheel 108), boundaries of the adjacent color segments in the color wheel are imaged onto the pixels of the spatial light modulator—resulting in spokes as will be detailed afterwards.

The spatial light modulator (116) comprises an array of individually addressable pixels, such as micromirror devices, liquid-crystal-on-silicon cells, and other types of devices. The pixels of the spatial light modulator can be operated in a binary mode or a non-binary mode. In the binary-mode, each pixel is switched between an ON and OFF state. The ON-state pixels reflect the incident light into on-state light (118) that propagates towards the projection lens (122); and the projection lens projects the on-state light onto a screen or other target for viewing. Pixels of the spatial light modulator at the OFF state modulate the incident light into off-state light (120) that propagates away from the projection lens (122).

The operational states of the spatial light modulator pixels are determined based upon the image data, such as bitplane data derived from the desired image to be displayed. In displaying color images that can be represented by a set of color image components, the image data can be bitplanes derived from the individual color image components. Preparation of the image data is performed by image processor 128 of system controller 126. Accordingly, the image processor is connected to the spatial light modulator (116) and image sources, such as video stream and image sources.

For increasing the bit-depth and/or the overall brightness of the display system, a lamp-pulsing technique can be employed. The lamp-pulsing technique dynamically adjusts the intensity of the light from the lamp by controlling the voltage or current driving the lamp. In one example, the controller (126) controls the light intensity through controlling the output voltage (or current) of lamp power 104 according to a pre-determined control scheme. In an alternative example, the lamp pulsing is accomplished through a control loop that comprises lamp 102, lamp sensor 124, controller 126, lamp power 104, and master clock 130. The lamp sensor (124) is capable of dynamically monitoring the illumination intensity (and/or the spectrum) of the light from the lamp (102). The monitored intensity (and/or the spectrum) is delivered to the system controller. The system controller analyzes the monitored results and generates corresponding lamp control signals for lamp power 104. Based upon the lamp control signals, lamp power dynamically adjusts its output (e.g. electrical current or power, or voltage) through lamp pulses so as to adjust the output light intensity from lamp 102. Exemplary lamp pulsing techniques are disclosed in Morgan US Pat. Pub. No. 2006/0181653 published Aug. 17, 2006, the subject matter being incorporated herein by reference in its entirety.

During operation, the color wheel spins so as to generate light of selected colors. Because the optical integrator (110) is positioned before the color wheel (108) (e.g. between lamp 102 and color wheel 108), boundaries of the adjacent color segments in the color wheel are imaged onto the pixels of the spatial light modulator—resulting in spokes in the pixels of the spatial light modulator, as demonstrated in FIG. 2 and FIG. 3.

Figure 2:
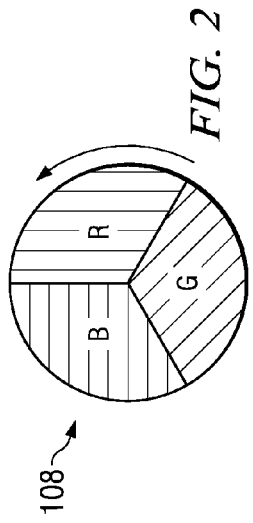
FIG. 2 schematically illustrates an exemplary color wheel comprising a set of transmissive color segments for use in the display system in FIG. 1.

For demonstration purposes, without losing generality, FIG. 2 diagrammatically illustrates an exemplary color wheel (108). The color wheel comprises transmissive color segments of red, green, and blue colors. The color segments of the color wheel are separated by segment boundaries. As the color wheel spins, the color segments sequentially intercept the light from the lamp of the system. However, the segment boundaries also intercept the light from the lamp, and are imaged onto the pixels of the spatial light modulator—resulting in spokes moving across the pixel array of the spatial light modulator. It is noted that the color wheel illustrated in FIG. 2 is only one of many possible examples. Many other color wheels or color filters are also applicable. For example, a color wheel or a color filter comprising reflective color segments is also applicable. The color segments, regardless of whether transmissive or reflective, can be arranged in the color wheel in many possible ways. For example, the color segments can be arranged in the wheel such that the boundaries of the color segments are curved, such as spiral or circular or other curved shapes. For demonstration purpose, FIG. 3 schematically illustrates a spoke caused by the boundary of the red and green color wheel segments.

Figure 3:
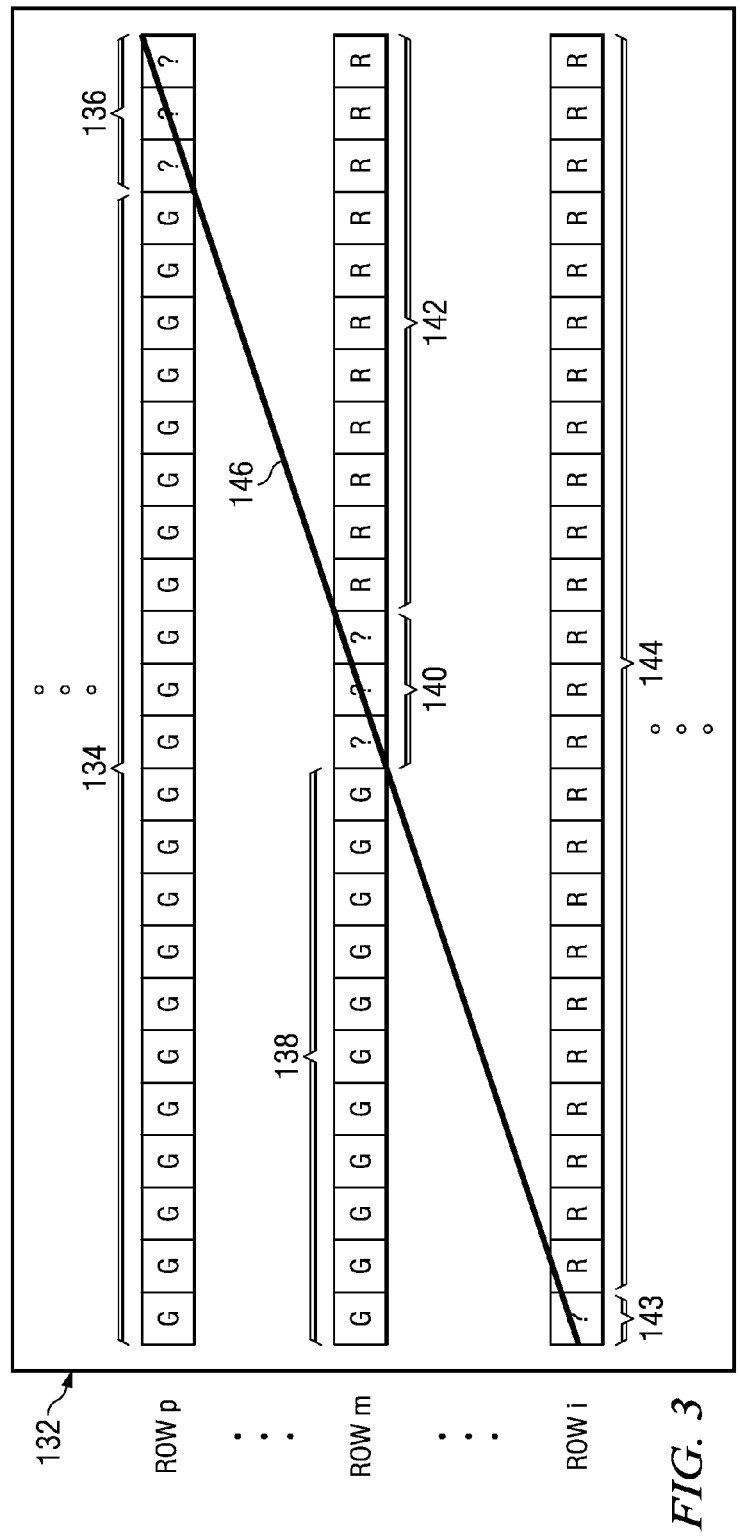
FIG. 3 schematically illustrates a spoke sweeping across the pixels of the spatial light modulator in the display system.

Referring to FIG. 3, pixels in rows from p to i of pixel array 132 in the spatial light modulator are illuminated by red and green colors simultaneously. Spoke 146 caused by the red and green color segments of the color wheel spans across rows from p to i. Pixels of row p are illuminated by green colors except pixels 136 of the $p^{th}$ row. The color of the light illuminating pixels 136 is a mixture of red and green colors and thus can not be used to display a pure color. For the same reason, the color of the light illuminating pixels 140 in row m and pixels 143 in the $i^{th}$ row are mixtures of red and green colors and thus cannot be used to display a pure color. Pixels 138 on the left side of spoke 146 and pixels 142 on the right side of the spoke in the $m^{th}$ row are illuminated by green and red colors respectively. Pixels 144 of the $i^{th}$ row are illuminated by red colors. As the color wheel spins, spoke 146 sweeps across the pixel rows over time; and the pixel rows change from one color to another.

In order to minimize the loss of the amount of pure color display time due to the spoke sweeping across the entire pixel array, pixel operations of modulating the incident light are synchronized with the spoke motion such that pixels illuminated by single color perform the desired modulation; while pixels being swept by the spoke are modulated to take advantage of the mixture of light during the spoke motion. Alternatively, though less preferred, the spoke time periods can be discarded for example, by setting the pixels being swept by the spokes not to modulate the incident light.

Figure 4:
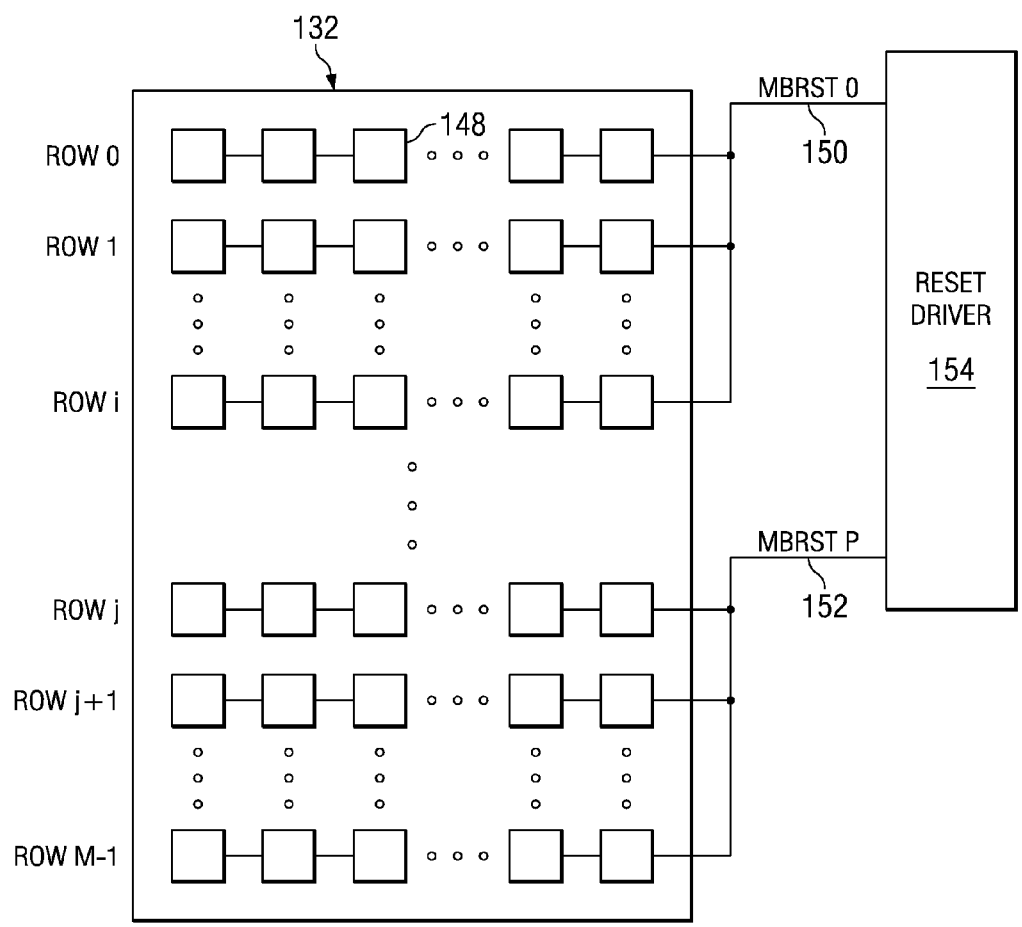
FIG. 4 schematically illustrates an exemplary configuration of an array of pixels of a spatial light modulator, wherein the pixel array is divided into reset groups.

The above spoke synchronization can be implemented in many ways. In one example, the pixel array can be divided into sub-arrays, and the spoke synchronization is performed based upon individual sub-arrays. Specifically, pixels in the sub-array currently being swept by the spoke are modulated to take advantage of the mixture of light. Pixels in other sub-arrays not being swept by the spoke are operated normally to display pure color(s) based upon the image data corresponding to the pure color image component(s) of the desired image. For example, pixels in the sub-array illuminated by the pure red (green or blue) color can be modulated to display the red (green or blue) color image component of the desired image. Pixels in the sub-array being swept by the spoke of the red and green colors (or other different colors) can be modulated to display the mixture of the red and green colors (or combinations of other colors). For demonstration purpose, FIG. 4 schematically illustrates an exemplary pixel array wherein the pixels are reflective and deflectable micromirror devices, such as a DMD device from Texas Instruments. Pixels of the DMD are divided into reset groups. It will be appreciated by those skilled in the art that the following discussion is for demonstration purpose and should not be interpreted as a limitation. Other variations are also applicable.

Referring to FIG. 4, micromirror array 132 comprises an array of micromirrors, such as micromirror device 148. The micromirrors are connected to a set of reset lines (e.g. MBRST 0 through MBRST p) through each of which reset signals can be delivered to the micromirrors. In an example, micromirror array 132 is divided into groups with each group comprising equal numbers of rows. The micromirrors in each group are connected to a reset line. As shown in the figure, it is assumed that micromirror array 132 has a number of M rows that are equally divided into M/(i+1) groups with each group comprising (i+1) rows and i being 47 or any desired values. The micromirror reset groups each are connected to one of a set of reset lines MBRST 0 to MBRST P. Specifically, the micromirrors in the group having rows 0 to row i are connected to MBRST 0 (150) The micromirrors in the group having rows j to row M−1 are connected to reset line 152 through which reset signals MBRST P can be delivered. The reset lines are connected to reset driver 154, which can be a DMD reset driver from Texas Instruments. Examples of driving the micromirrors in reset groups are discussed in Doherty U.S. Pat. No. 6,201,521 issued Mar. 13, 2001, and Doherty U.S. Pat. No. 5,969,710 issued Oct. 19, 1999, the subject matter of each being incorporated herein by reference in its entirety. With the reset groups, the spoke synchronization can be performed on the basis of reset groups, as schematically illustrated in FIG. 5.

Figure 5:
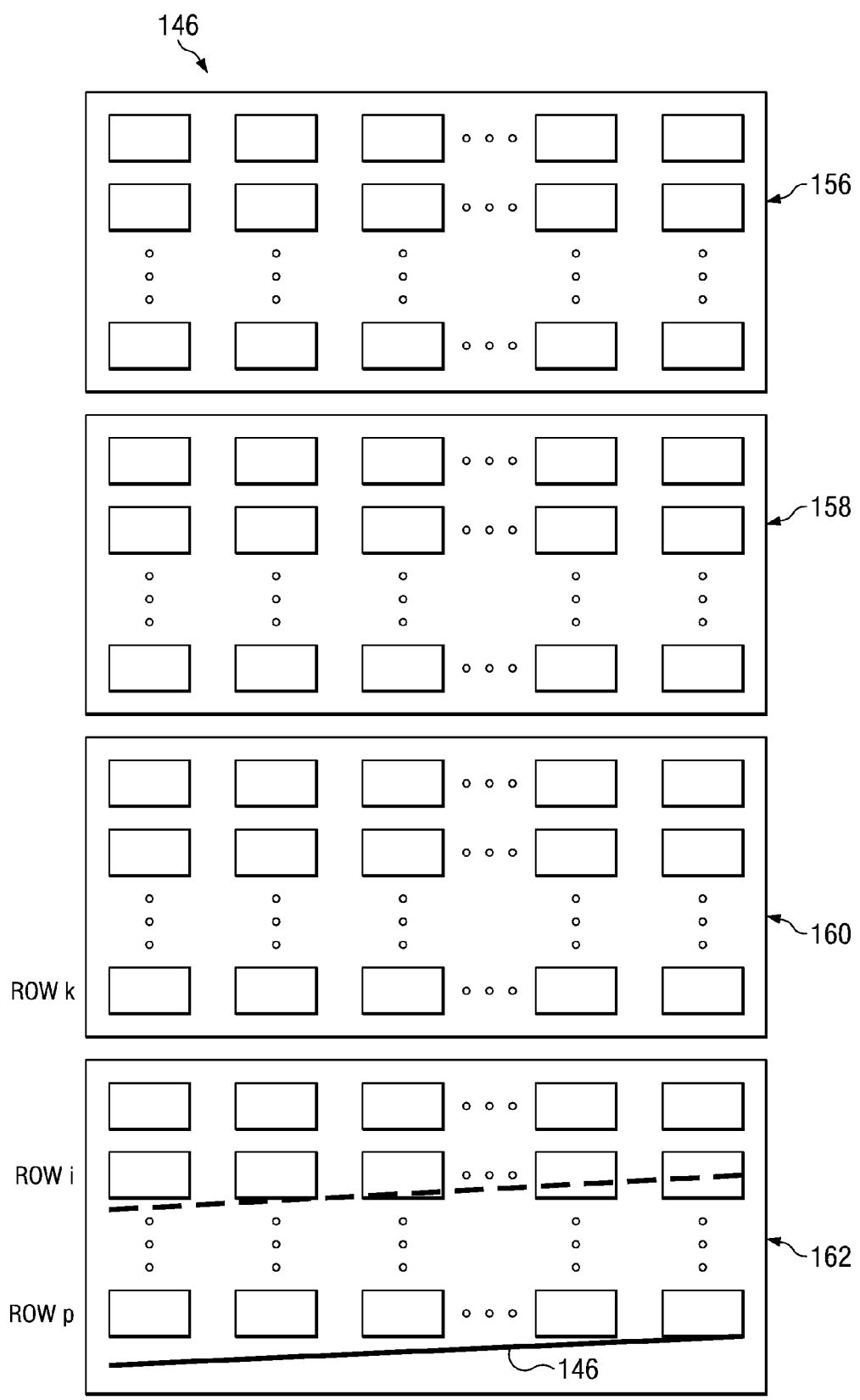
FIG. 5 schematically demonstrates an exemplary method of spoke synchronization, which allows for lamp-pulsing.

Referring to FIG. 5, 4 reset groups 156, 158, 160, and 162 are illustrated for simplicity. As discussed above, the micromirror array (146) may comprise any suitable number of reset groups. It is assumed that spoke 146 sweeps the micromirror array from the bottom to the top (can be in other directions); and reset group 162 is the first reset group at the bottom of the micromirror array.

Before spoke 146 enters into reset group 162, the micromirrors of the array can be operated normally based on the image data derived from the color image component of the desired image to be produced, wherein the color image component corresponds to the pure color illuminating the pixels of reset group 162. At time $T_o$ when the spoke starts to sweep across the micromirrors in reset group 162, the micromirrors in reset group 162 stop the modulation designed for displaying the pure color image component to instead modulate in a way so as to take advantage of the color-mixed light. Upon the spoke leaving reset group 162, the micromirrors in reset group 162 resume their normal operations—being operated according to the corresponding image data of the pure color image component. Positions of the spoke can be pre-calculated based upon the specific configuration of the color wheel and the system. Alternatively, the position of the spoke can be dynamically monitored using a detector, which can be disposed approximate to the micromirror array or approximate to the output of the color wheel.

It is noted that the light at the top and the bottom of the spoke has different colors. For example, the light on the top of the spoke (e.g. right before the spoke) has a red color; while the light at the bottom (right after the spoke) has a green color. Accordingly, micromirrors in reset group 162 are operated to modulate the red light based on the image data derived from the red color component of the desired image before spoke 146; and are operated to modulate the green color light based on the image data derived from the green color component of the desired image upon spoke 146 leaving reset group 162.

It can be seen from the above example that micromirrors in reset groups not being swept by a spoke (or spokes in some examples) can be operated normally based upon the image data of the particular color components that correspond to the light of the "pure color" incident thereto. Micromirrors of the reset group being swept by a spoke can be operated differently, such as being operated to take advantage of the spoke-mixed light. Upon the spoke leaving the reset group, the reset group resumes its normal operation, therefore, accomplishing the spoke synchronization.

The above spoke synchronization can be accomplished through the system controller (e.g. system controller 126 in FIG. 1) by controlling the data delivered to the pixels of the spatial light modulator.

The above spoke synchronization allows for lamp-pulsing. For demonstration purpose, FIG. 6 schematically demonstrates a lamp-pulsing technique working with the spoke synchronization.

Figure 6:
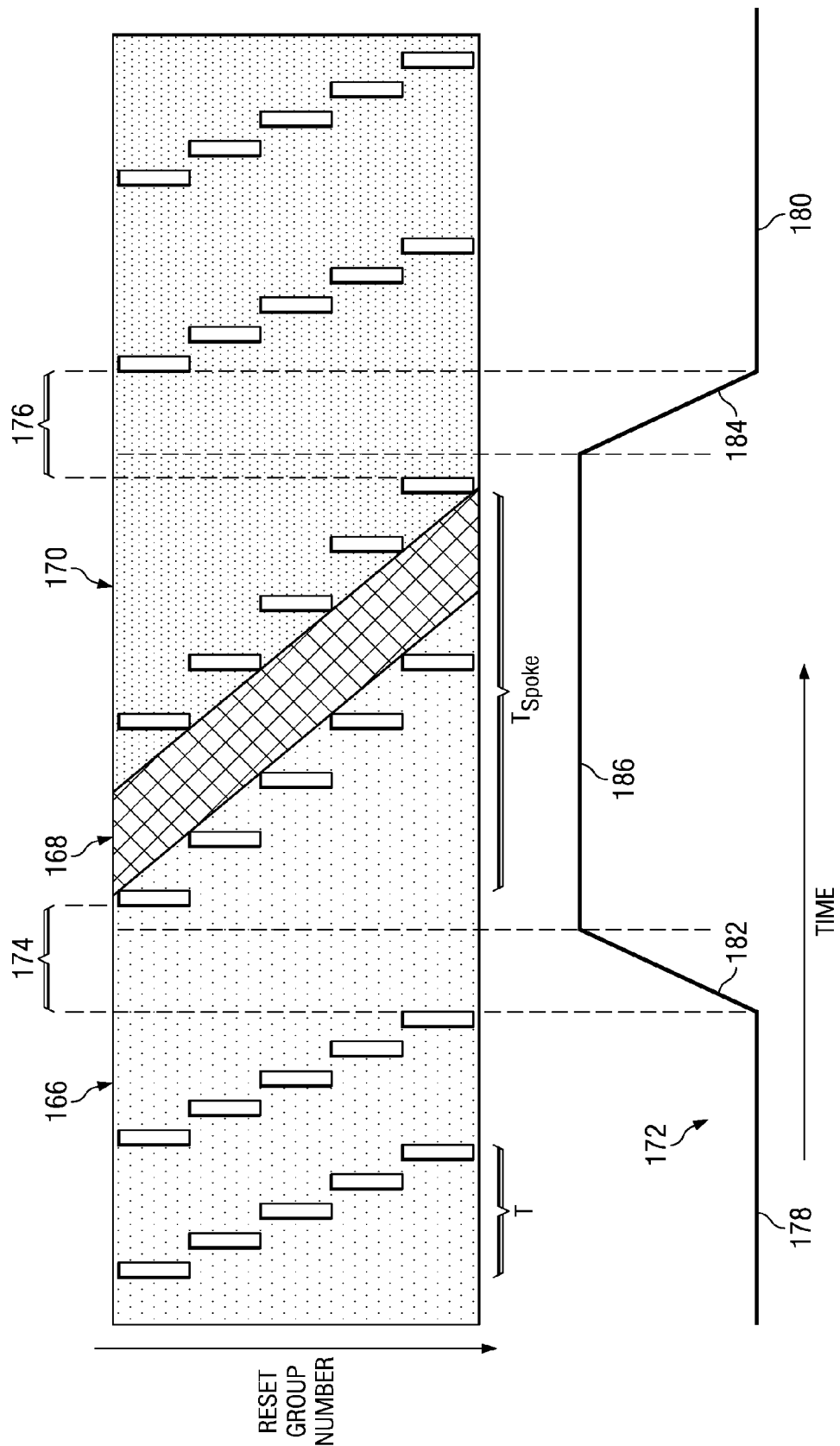
FIG. 6 diagrammatically illustrates lamp-pulsing performed with the spoke synchronization in FIG. 5.

Referring to FIG. 6, 5 reset groups of a micromirror array are illustrated for simplicity purpose, and the micromirror array may have any desired number of reset groups as discussed above. The horizontal axis is time; and the vertical axis is the reset group index. Each solid block represents a reset group and the reset operation of the pixels in the reset group. A reset operation of a pixel is an operation wherein the pixel changes its operation state based on the data (e.g. the bit data) received by the pixel. For example, a typical operation of each reset group (and each pixel of the reset groups) in displaying a bitplane starts from loading the image data (e.g. loading a bitplane into memories associated with the micromirrors in a reset group) during a loading time. The micromirrors in the reset group are reset based on the loaded data during the reset time. After the reset, micromirrors of the reset group hold their states for a time period corresponding to the weight of the bitplane so as to display the bitplane. For simplicity purpose, the reset operation of pixels in each reset group is illustrated as a solid-block; while the associated data loading and data displaying operations are not shown in FIG. 6. Different shadings in this figure represent light of different colors illuminating the micromirrors of the array.

As illustrated in the top diagram of FIG. 6, the reset groups (represented by the solid-blocks) are sequentially reset for each bitplane. For example, the 5 reset groups are sequentially operated during time period T for displaying a particular bitplane (e.g. the $i^{th}$ bitplane). Again, such operation comprises data loading, pixel resetting, and data displaying as discussed above; and only the pixel resetting is illustrated, which is represented by solid-blocks.

The above operations are performed for each of the reset groups in each pure color region (e.g. pure color regions 166 and 170). In spoke region 168 corresponding to the spoke time period, reset groups are operated with a spoke synchronization scheme as discussed above with reference to FIG. 5.

A typical pulse (172) for lamp pulsing is schematically illustrated in the lower panel of FIG. 6, wherein the lamp pulse (172) comprises stable states 178, 180 (bottom stable states), and 186 (the top stable state); and varying states 182 (rising edge) and 184 (falling edge). During the stable states of the lamp pulse, the light intensity is substantially stable. During the varying states, the intensity of the light from the lamp varies. The spoke-chasing and the lamp-pulsing can be synchronized in a wide range of ways, an example of which is diagrammatically in FIG. 6. However, other synchronizations are also applicable. Regardless of the differences, it is preferred that resetting operations of the spatial light modulator pixels occur substantially during the stable state(s) of the lamp pulse(s). Varying states (e.g. the rising and falling edges) of the lamp pulse appear during time periods when pixels of the spatial light modulator are not reset (e.g. when substantially all pixels maintain their instant states), or during time periods when less or least amount of pixel resets occur. Other operations, such as data loading and/or data displaying by the pixels of the spatial light modulator, however, may occur during the stable and/or varying states of the lamp pulse. The stable state, such as the top stable state 186 can span across the entire spoke time (as illustrated in FIG. 6), or alternatively, can substantially reside at the pure color region if allowed. For example, a lamp pulse may occur between adjacent bitplane displaying.

In the example as schematically illustrated in FIG. 6, during the spoke synchronization time period $T_{spoke}$, a lamp-pulsing can be performed such that the lamp pulse (172) spans across substantially the entire spoke synchronization time period. The entire spoke synchronization time period $T_{spoke}$ is the time interval during which a spoke sweeps across all reset groups of the micromirror array. As illustrated in FIG. 6, the lamp pulse (172) spans across the time period within which the spoke sweeps across all 5 reset groups in the micromirror array that comprises 5 reset groups in this example.

The rising edge (182) of the pulse (172) substantially resides in time region 174 in the pure color region 166; and the falling edge (184) resides in the time region 176 in the pure color region 170. During each one of the time regions 174 and 176, substantially no pixel resets occur. Substantially all data resetting operations occur during the stable states of the lamp pulse (e.g. during the stable states 178, 180, and 186). As discussed above, other operations, such as data loading and/or data displaying can occur at any time. Linear bit weighting is retained by accommodation of ramp up and down in "pure color" bits. Specifically, linear bit weighting may be retained by adjusting the bit time on a reset-group-per-reset-group basis so as to counteract the non-linearity across the top and the bottom pixels of the spatial light modulator caused by the lamp transactions within a pure-color segment. As such, the reset groups of the spatial light modulator performs normal operation for modulating the light incident thereto substantially only when the lamp is at a steady state.

It will be appreciated by those of skill in the art that a new and useful spoke synchronization allowing for lamp pulsing has been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

We claim:

1. A method for use in displaying an image, comprising:
generating a sequence of different color light by directing light of an intensity from a lamp through a spinning color wheel that comprises a set of corresponding different color segments separated by a set of segment boundaries;
sequentially illuminating an array of individually addressable pixels of a spatial light modulator using the sequence of different color light, wherein each segment boundary is imaged onto the pixel array forming a spoke;
dynamically adjusting the intensity of the light from the lamp by controlling the voltage or current driving the lamp, wherein lamp pulses comprise stable states separated by rising and trailing edges; dividing the pixel array of the spatial light modulator into a set of sub-arrays such that the pixels of each sub-array form a reset group connected for reset to a respective common reset signal; and
synchronizing pixel operations so that pixels of sub-arrays being swept by a spoke are modulated to display mixed color, pixels of sub-arrays not being swept by a spoke are modulated to display single color, pixels of all sub-arrays are reset substantially only during stable states of lamp pulses, and pixels of sub-arrays being swept by a spoke are not illuminated by lamp pulse rising and trailing edges.

2. The method of claim 1, wherein the pixels are modulated based upon a set of image data derived from color image components of a desired image, wherein the color image components correspond to the colors of light from the different color segments.

3. The method of claim 2, wherein modulating the pixels includes loading the set of image data; resetting the pixels based on the loaded set of image data; and holding the settings of the pixels for a time period.

4. The method of claim 3, wherein a lamp pulse used for the lamp pulsing spans substantially across the entire spoke time.

5. The method of claim 4, wherein the lamp pulse comprises a raising edge and a falling edge; and wherein the resets occur substantially outside the raising and falling edge times.

6. A method for use in displaying an image, comprising:
sequentially illuminating sub-arrays of individually addressable pixels of a spatial light modulator with different colors of light by directing light of an intensity from a lamp successively through different color segments of a spinning color wheel, the different color segments being separated by segment boundaries;

resetting the pixels of each sub-array in response to respective common reset signals for each sub-array according to bitframe data received for imaging the respective different colors in synchronization with illumination of the sub-array by the corresponding color; and applying a pulse signal to change the intensity of the light directed from the lamp in synchronization with resetting the pixels and receipt of the bitframe data, the pulse signal including stable states separated by rising and trailing edges;

wherein pixel operations are synchronized so that pixels of sub-arrays illuminated by light directed through plural color segments are modulated to display mixed color, and pixels of sub-arrays illuminated by light directed through single color segments are modulated to display single color; and wherein none of the pixels of any sub-array is reset during the rising or trailing edges of the pulse signal, none of the pixels of any sub-array is reset while the pixels of that sub-array are illuminated simultaneously by light from different color segments separated by a segment boundary, and pixels of sub-arrays being swept by a spoke are not illuminated by lamp pulse rising and trailing edges.

\* \* \* \* \*